United States Patent
Tognelli

[19]

[11] Patent Number: 5,773,117
[45] Date of Patent: Jun. 30, 1998

[54] DEEP RIBBED SANDWICH PANEL AND METHOD FOR ITS MANUFACTURE

[75] Inventor: Giorgio Tognelli, Verderio Superiore, Italy

[73] Assignee: Metecno S.p.A., Italy

[21] Appl. No.: 564,267

[22] PCT Filed: May 8, 1995

[86] PCT No.: PCT/EP95/01737

§ 371 Date: Dec. 27, 1995

§ 102(e) Date: Dec. 27, 1995

[87] PCT Pub. No.: WO95/31619

PCT Pub. Date: Nov. 23, 1995

[30] Foreign Application Priority Data

May 13, 1994 [IT] Italy .................................. VE94A0022

[51] Int. Cl.⁶ .................................. B32B 1/04; B31B 1/60
[52] U.S. Cl. ........................... 428/75; 428/114; 428/167; 428/172; 428/174; 428/178; 428/182; 156/60; 156/210; 264/257; 425/397
[58] Field of Search ..................................... 428/178, 182, 428/174, 167, 76, 74.75, 114, 172; 156/60, 210, 297, 300; 264/167, 145, 241, 257; 425/383, 397, 403, 472

[56] References Cited

U.S. PATENT DOCUMENTS

| | | | |
|---|---|---|---|
| 2,576,698 | 11/1951 | Russum | 428/75 |
| 3,003,902 | 10/1961 | McDutt | 428/75 |
| 3,031,358 | 4/1962 | Rutter et al. | 428/75 |
| 3,302,358 | 2/1967 | Jackson | 428/75 |
| 3,969,563 | 7/1976 | Hollis | 428/178 |
| 4,294,875 | 10/1981 | Schramm | 428/72 |

FOREIGN PATENT DOCUMENTS

| | | |
|---|---|---|
| 0396306 | 11/1990 | European Pat. Off. . |
| 2629117 | 9/1989 | France . |
| 2077807 | 12/1981 | United Kingdom . |
| 2247699 | 3/1992 | United Kingdom . |

*Primary Examiner*—Donald Loney
*Attorney, Agent, or Firm*—Hoffman, Wasson & Gitler

[57] ABSTRACT

A deep ribbed sandwich panel having at least one shaped metal sheet with ribs, and a layer of insulating material consisting of mineral wool fibers, wherein the ribs are filled with at least one mineral fiber strip having a shape complementary to that of the shaped edge of the ribs.

20 Claims, 4 Drawing Sheets

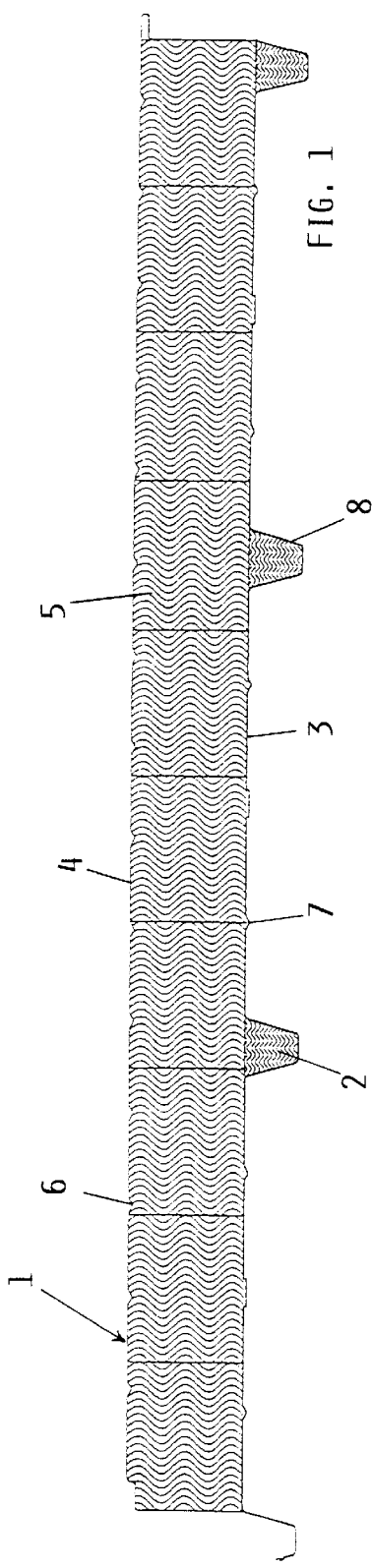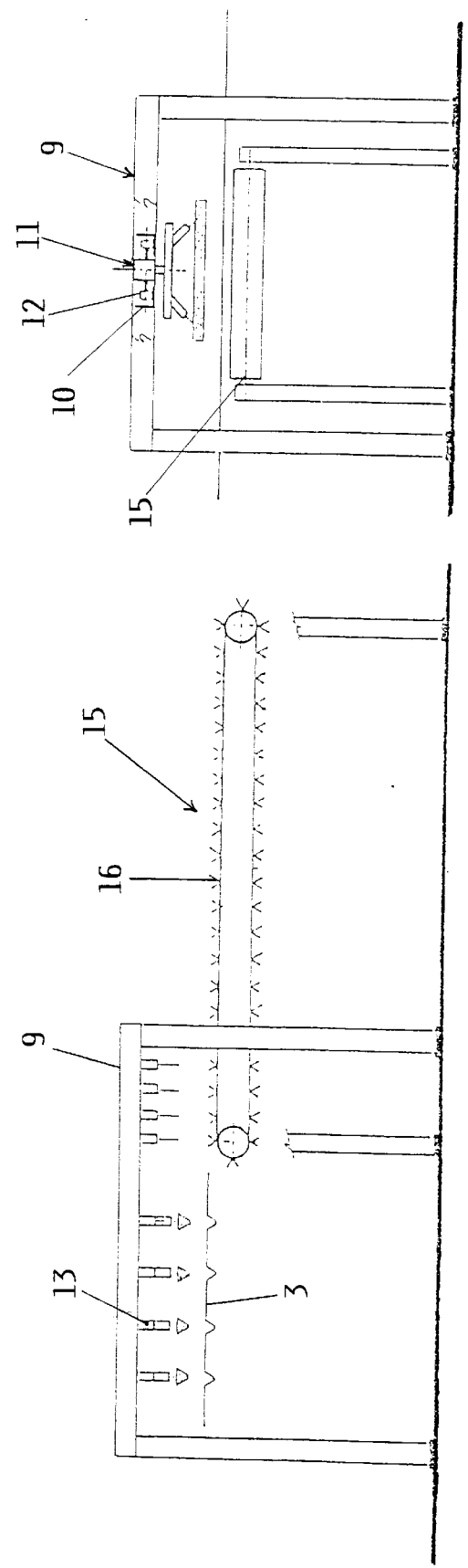

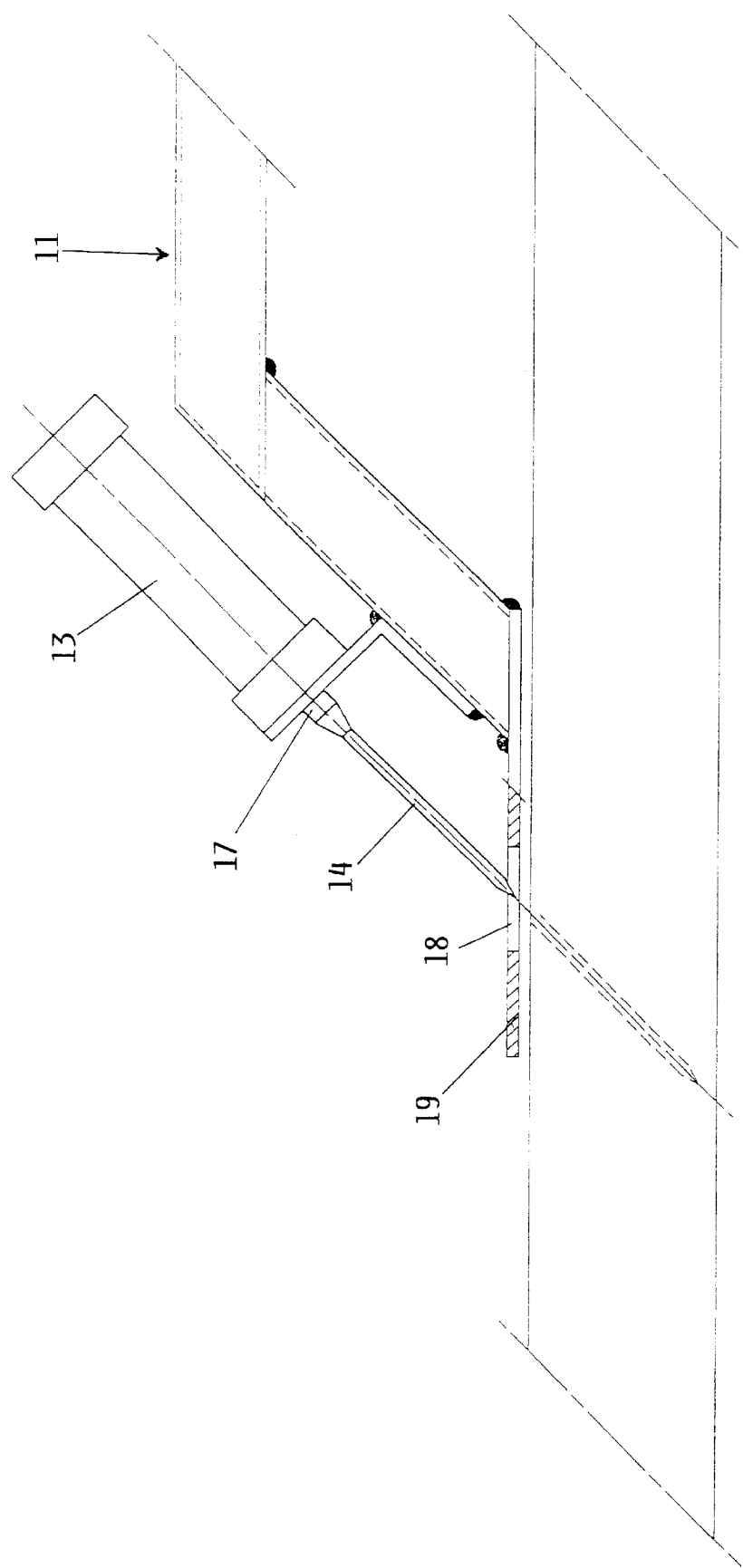

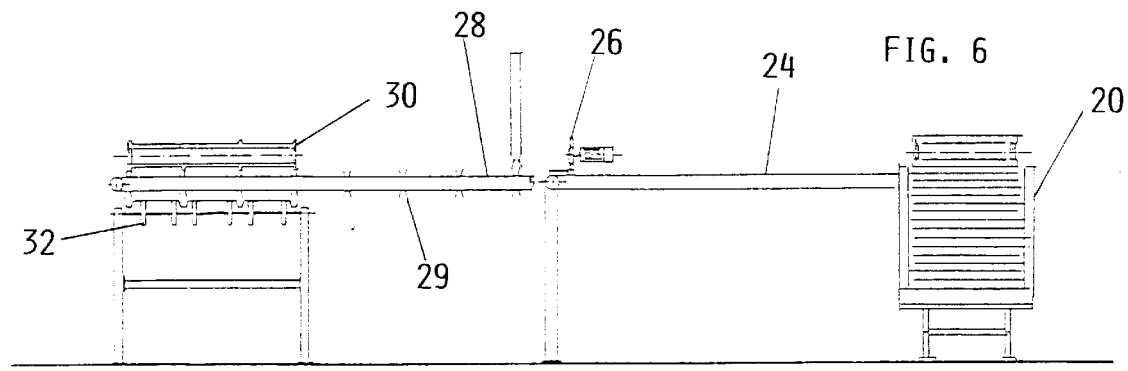
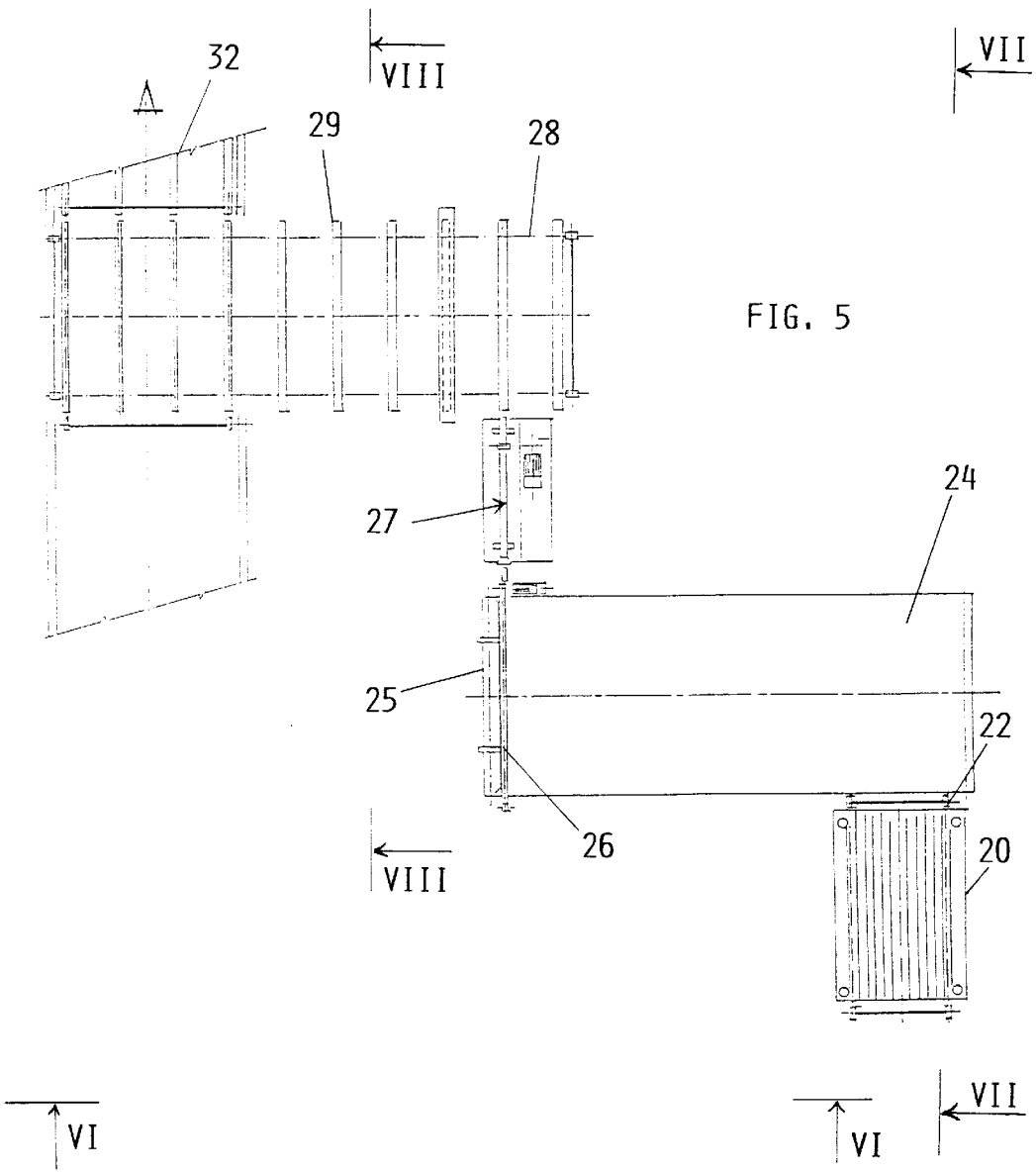

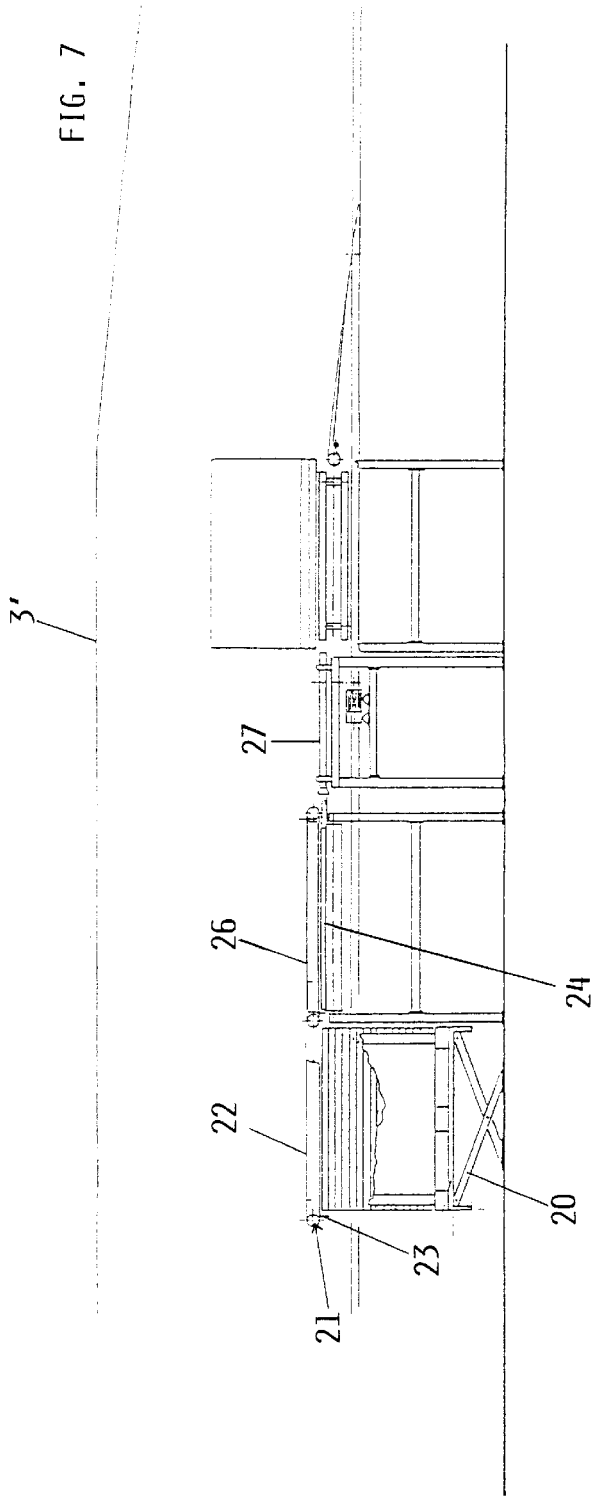
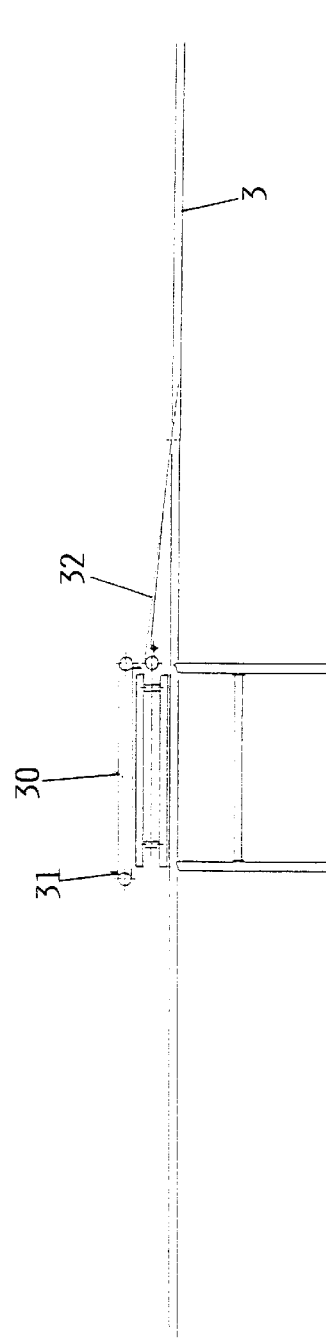
FIG. 7
FIG. 8

DEEP RIBBED SANDWICH PANEL AND METHOD FOR ITS MANUFACTURE

This invention relates to a deep ribbed sandwich panel and a method for its manufacture.

Sandwich panels are known consisting of two profiled metal sheets between which a layer of insulating material, preferably polyurethane foam, is interposed.

A method for the continuous manufacture of said panels is known by which two sheet metal webs are passed through suitable shaping machines which give them their required shape, in particular by forming longitudinal stiffening ribs which in some cases have a height comparable with the overall thickness of the panel (deep ribbed panel). The webs are advanced in such a manner as to be maintained at a distance apart corresponding to the thickness of the panel to be formed, and a plastics material such as polyurethane foam is fed between these so that on expanding it forms the insulating layer of the panel. When the plastics expansion process has ended, the continuous panel hence formed is passed through a cutting station in which it is reduced to finished panels of the required length.

These known panels have however the drawback of poor flame resistance due to the presence of the foamed material.

To obviate this drawback it has been proposed to form sandwich panels in which the internal layer of insulating material consists of a plurality of side-by-side coplanar strips of mineral fibre with their longitudinal axis perpendicular to the longitudinal axis of the panel and with the fibre axis perpendicular to the metal sheets.

In the case of deep ribs the problem of rib filling exists because the mineral fibres cannot be injected, whereas the more simple solution of not in fact filling the ribs has certain drawbacks, including:

- the creation of channels along which flames and oxygen can propagate in the case of fire,
- a substantial reduction in transverse rigidity of the panel with consequent handling difficulties during installation,
- the lack of thermal insulation at these ribs with the possibility of condensate formation.

To overcome these drawbacks it has been proposed to fill the rib cavities with a plastic insulating material such as polyurethane.

Such a panel has however the drawback, in the case of fire, of different behaviour between the non-combustible mineral fibres and the highly combustible polyurethane.

In another known type of panel a mixture of polyurethane and mineral fibres is injected into the deep ribs.

However, although to a lesser extent, this type of panel also has the drawback of possibility of combustion because of the polyurethane present.

An object of the invention is to obviate these drawbacks by providing a deep ribbed sandwich panel in which the entire filling consists of mineral fibres.

A further object of the invention is to provide a method enabling a panel to be manufactured continuously and automatically.

These and further objects which will be apparent from the ensuing description are attained according to the invention by a sandwich panel as described.

The invention addresses a deep ribbed sandwich panel, as well as a process and apparatus for making the panel. The panel includes at least one shaped metal sheet having at least one rib thereon and a layer of insulating material wherein the ribs are filled with mineral fiber strips having a cross section complementary to the cross section of the ribs.

BRIEF DESCRIPTION OF THE DRAWINGS

The present invention is described in detail hereinafter with reference to the accompanying drawings in which:

FIG. 1 is a cross-section through a sandwich panel according to the invention;

FIG. 2 is a schematic view of an apparatus for inserting the strips into the ribs;

FIG. 3 is a side view thereof;

FIG. 4 is a detail of the raising system;

FIG. 5 is a plan view of a further plant for forming the panel;

FIG. 6 is a view thereof on the line VI—VI of FIG. 5;

FIG. 7 is a view thereof on the line VII—VII of FIG. 5; and

FIG. 8 is a view thereof on the line VIII—VIII of FIG. 5.

DETAILED DESCRIPTION OF THE PREFERRED EMBODIMENTS

As can be seen from the figures, the sandwich panel according to the invention, indicated overall by 1, is of the deep ribbed type, ie with stiffening ribs of height comparable with the overall panel thickness and consists of two metal sheets 3,4 between which a layer 5 of mineral wool fibres is interposed.

Specifically, the insulating layer 5 is formed from a series of side-by-side strips 6 with their longitudinal axis parallel to the longitudinal axis of the panel and with the fibre axis arranged perpendicular to the strip axis.

The metal sheets of each panel also comprise a plurality of internal and external longitudinal grooves 7 of small height compared with the panel thickness.

Within the ribs 2 there are inserted strips 8 having a cross-section complementary to the cross-section of the ribs and with the fibre axis perpendicular to the longitudinal axis of the strip and parallel to the sheet metal surfaces.

To construct a panel according to the invention an apparatus is provided comprising a portal frame 9 arranged transverse to the direction of advancement of the sheet metal web leaving the shaping line which shapes the sheet metal with deep ribs 2 having their concavity facing upwards. The upper cross-member of the portal frame comprises two mutually facing C-shaped guides within which there are guided four transport elements raisable by conventional systems and indicated overall by 11.

Each transport element 11 comprises a pair of rollers 12 slidable along the guides and supporting gripping elements consisting of two pneumatic cylinders 13 with their axes downwardly diverging, their rods 17 being provided at their ends with needles 14. Each needle 14 passes through a hole 18 provided in a plate 19 rigid with the cylinder body.

In a position facing the portal frame there is provided a chain conveyor 15 which rotates a plurality of cradles 16 having a shape substantially corresponding to the shape of the rib 2.

In operating the apparatus the cradles 16 of the chain conveyor are filled automatically or manually with corresponding mineral fibre strips 8.

When the cradles have arrived in proximity to the end of the chain, a command is fed to the cylinders 13 to cause their rods 17 and the needles 14 fixed to them to emerge, with consequent engagement of the underlying strip.

The guide is then made to rise until the strip disengages from the relative cradle, after which the four transport elements 11 are advanced by a pneumatic cylinder (not shown on the drawings) fixed to the first transport element along the guides so that they become positioned overlying the ribs provided in the panel which is advancing below.

This first transport element is connected by a flexible cable to the second element, which is connected to the third element connected in its turn to the fourth element. In this manner the transport elements are in mutual contact when they lie above the cradles of the chain conveyor, whereas they are spaced apart during their travel towards the sheet metal web.

The cylinder rods are then made to totally retract so that by virtue of the plates the needles 14 disengage from the strips, which can then rest in the ribs 2.

It should be noted that the speed of advancement of that sheet metal web comprising the deep ribs is synchronized with the speed of the chain conveyor and the movement of the transport element and cylinders so that the time required to advance the sheet metal web through a distance corresponding to the length of the strip equals the time taken by the transport elements, once they have deposited the strips in the ribs, to return to their position above the conveyor belt, pick up the strips and return to their position above the sheet metal.

In all cases, control devices of photoelectric cell type are provided able to indicate the exact position of the strips within the ribs and to control the operating cycle of the transport elements.

The sheet metal web 3 with its ribs 2 hence filled with the mineral fibre strips 8 is then fed to a conventional panel forming line along which a layer of insulating material consisting of mineral fibre strips is interposed between the lower sheet metal web 3 comprising the deep ribs and the upper sheet metal web 4.

In a different embodiment, shown in FIGS. 5 to 8, the plant for inserting the strips 8 into the ribs uses an elevator table 20 supporting boxes containing the cut strips 8. In a position above said table there is provided a pusher 21 consisting of a pair of chains 22 provided with pusher blades 23 pushing towards an accumulation/conveyor belt 24 constructed of material having a low coefficient of friction and high wear resistance.

In a position corresponding to the end of the belt there is provided a stop and above this there is provided a further pusher member of blanded type 26 for inserting the strips into an orientating member 27.

This orientating member consists of a rotating hollow shaft having an inner radius slightly greater than the radius of the circle circumscribing the trapezoidal cross-section of the strip 8, so that the strip can be inserted into said shaft without excessive friction. The length of said shaft is less than the length of the strip so that the ends of the strip emerge from said shaft, to enable the orientation of the strip inserted into it to be confirmed.

The entry end of the shaft is of conical shape to facilitate introduction of the strip.

In a position facing the exit of the orientator there is provided a conveyor 28 comprising cradles 29 with its direction of advancement perpendicular to the axis of the orientator.

The distance between the axes of the cradles, which as in the preceding case have a shape corresponding to that of the strip cross-section, is substantially equal to the distance between the axes of the ribs 2 of the metal sheet 3.

The advancement line for the upper metal sheet 3' and lower metal sheet 3 forming the panel to be constructed is provided in a position longitudinally aligned with the end cradles of the conveyor belt.

Specifically, the last four cradles of the belt conveyor are always located in correspondence with the ribs 2 of the lower metal sheet 3, whereas one cradle is always coaxial with the shaft of the strip orientator, ready to receive the orientated strip.

The conveyor 28 moves stepwise, so that for each three strip loading cycles a cycle occurs in which they are discharged onto the underlying cradles.

Overlying the cradle conveyor 28 there is provided a transfer pusher 30 consisting of a pair of chains provided with a shaped blade 31 able to penetrate between the cradles on the belt.

Longitudinally aligned with the conveyor cradles 29 there are provided three small conveyor belts 32, each of which consists of a guide inclined towards the base of the rib 2 in the metal sheet and provided with side walls with the exception of the front end, where it penetrates into the corresponding rib via a curvature formed by bending said end.

Each belt passes at its front end about a motorized roller, all rollers being mounted on the same drive shaft.

A photoelectric cell system, not shown on the drawings, enables the rib filling to be monitored and the travel of the transfer pusher to be controlled.

The advancement speed of the three belts is just greater than the advancement speed of the constituent metal sheets of the panel, so as to ensure continuity between the successively inserted strips.

To insert the strips into the ribs, the currently described plant requires the shaped strips to be deposited on the surface of the elevator table 20 the strips having their fibres orientated parallel to the base and perpendicular to the length of the strips.

The strips, which as stated are of isosceles trapezoidal cross-section, are also arranged with their major face alternately facing one direction and the other in the same layer.

The layers of strips are withdrawn individually and transferred by the pusher 21 comprising blades 23 onto the conveyor belt 24, at the end of which the bladed pusher 26 removes the strips one at a time by withdrawing them laterally and inserting them into the hollow shaft forming the orientator 27.

Here, each strip is made to rotate through 90° to the right or left about its axis until the minor base of the trapezoidal cross-section faces downwards.

The introduction of a new strip into the orientator causes the preceding strip to be expelled, this being hence inserted into the facing cradle 29 of the cradle conveyor 28. During the stepwise movement of the conveyor 28 the various cradles are filled, and when the last three are in position overlying the ribs of the panel to be constructed, the transfer pusher is activated to transfer the strips onto the belts for insertion, during the next stage of the cycle, into the ribs of the sheet metal web which is advancing.

I claim:

1. A deep ribbed sandwich panel comprising at least one shaped metal sheet having a top surface and at least one rib which extends above said top surface, and a layer of insulating material consisting of mineral wool fibers, wherein said at least one rib is filled with at least one mineral fiber strip having a cross section complementary to a cross section of said at least one rib, wherein said at least one mineral fiber strip has a fiber axis parallel to the top surface of said at least one shaped metal sheet.

2. A deep ribbed sandwich panel as claimed in claim 1 wherein said at least one shaped metal sheet of said panel, further comprises a plurality of internal and external longitudinal grooves of height less than a thickness of said panel.

3. A deep ribbed sandwich panel as claimed in claim 1 wherein said at least one rib has a trapezoidal cross section.

4. A method for constructing a deep ribbed sandwich panel comprising the steps of:

providing at least one shaped metal sheet with at least one rib having a cross section;

inserting a mineral fiber strip having a cross section complementary to that of said at least one rib into each said at least one rib of said at least one shaped metal sheet; and applying a layer of insulating material onto said at least one shaped metal sheet.

5. A method for constructing said deep ribbed sandwich panel as claimed in claim 4 wherein said at least one mineral fiber strip is inserted into said at least one rib automatically from above at an exit of a shaping station for said at least one shaped metal sheet.

6. A method for constructing said deep ribbed sandwich panel as claimed in claim 4 wherein said at least one mineral fiber strip is fed by a conveyor belt comprising cradles having a shape and dimension substantially corresponding to said at least one rib.

7. A method for constructing said deep ribbed sandwich panel as claimed in claim 6 further comprising the steps of:

cutting a plurality of substantially trapezoidal cross-section mineral fiber strips, each having fibers arranged parallel to the base and orthogonal to the length of said strips, orienting said strips so as to arrange them with a major face facing upwards, inserting said strips in said conveyor belt comprising cradles, and introducing said strips in said at least one rib of an advancing metal sheet.

8. An apparatus for constructing a deep ribbed sandwich panel comprising a cradles conveyor having cradles, said cradles having a shape substantially corresponding to a trapezoidal shape of mineral fiber strips to be inserted into ribs of a metal sheet; and a means for transferring said mineral fiber strips housed in said cradles into said ribs during advancement of said metal sheet.

9. An apparatus for constructing a deep ribbed sandwich panel as claimed in claim 8 wherein said cradle conveyor has an interaxial distance between said cradles corresponding to an interaxial distance between said ribs to be filled.

10. An apparatus for constructing a deep ribbed sandwich panel as claimed in claim 8 wherein said transferring means consists of a gripping element consisting of two pneumatic cylinders with axes downwardly diverging, said two pneumatic cylinders having rods at their ends with needles, said needles passing through a hole provided in a plate rigid with a cylinder body.

11. An apparatus for constructing a deep ribbed sandwich panel as claimed in claim 8 wherein said transferring means are mounted in a position overlying said ribs of said metal sheet.

12. An apparatus for constructing a deep ribbed sandwich panel as claimed in claim 8 wherein said transferring means are mounted on carriages slidable along a portal frame arranged transverse to a direction of advancement of said metal sheet.

13. An apparatus for constructing a deep ribbed sandwich panel as claimed in claim 12 wherein said carriages are connected to each other by a flexible cable.

14. An apparatus for constructing a deep ribbed sandwich panel as claimed in claim 8 further comprising an orienting member for said strips located upstream of said cradle conveyor and arranged orthogonal with respect to its advancement direction; and a belt conveyor constructed of a material having a low coefficient of friction and high wear resistance for supporting said strips with their fibers arranged parallel to the base of said strips and perpendicular to their length, said strips also arranged with their major face alternately facing one direction and the other.

15. An apparatus for constructing a deep ribbed sandwich panel as claimed in claim 14 wherein said orienting member consists of a rotating hollow shaft having a radius slightly greater than a radius of a circle circumscribing a trapezoidal cross-section of said strip, said shaft having a length which is less than a length of said strip.

16. An apparatus for constructing a deep ribbed sandwich panel as claimed in claim 15 wherein said shaft has an entry end of a conical shape.

17. An apparatus for constructing a deep ribbed sandwich panel as claimed in claim 14 wherein said orienting member has an axis of rotation of 90° to the left or to the right.

18. An apparatus for constructing a deep ribbed sandwich panel as claimed in claim 14 further comprising sliding inclined guides between said cradle conveyor and said metal sheet.

19. An apparatus for constructing a deep ribbed sandwich panel as claimed in claim 18 further comprising a pusher which causes transfer of said strips from said cradles of said conveyor to said inclined guides for insertion into said ribs of said metal sheet.

20. A deep ribbed sandwich panel as claimed in claim 1 wherein said layer of insulating material has a fiber axis that is perpendicular to the top surface.

* * * * *